UNITED STATES PATENT OFFICE.

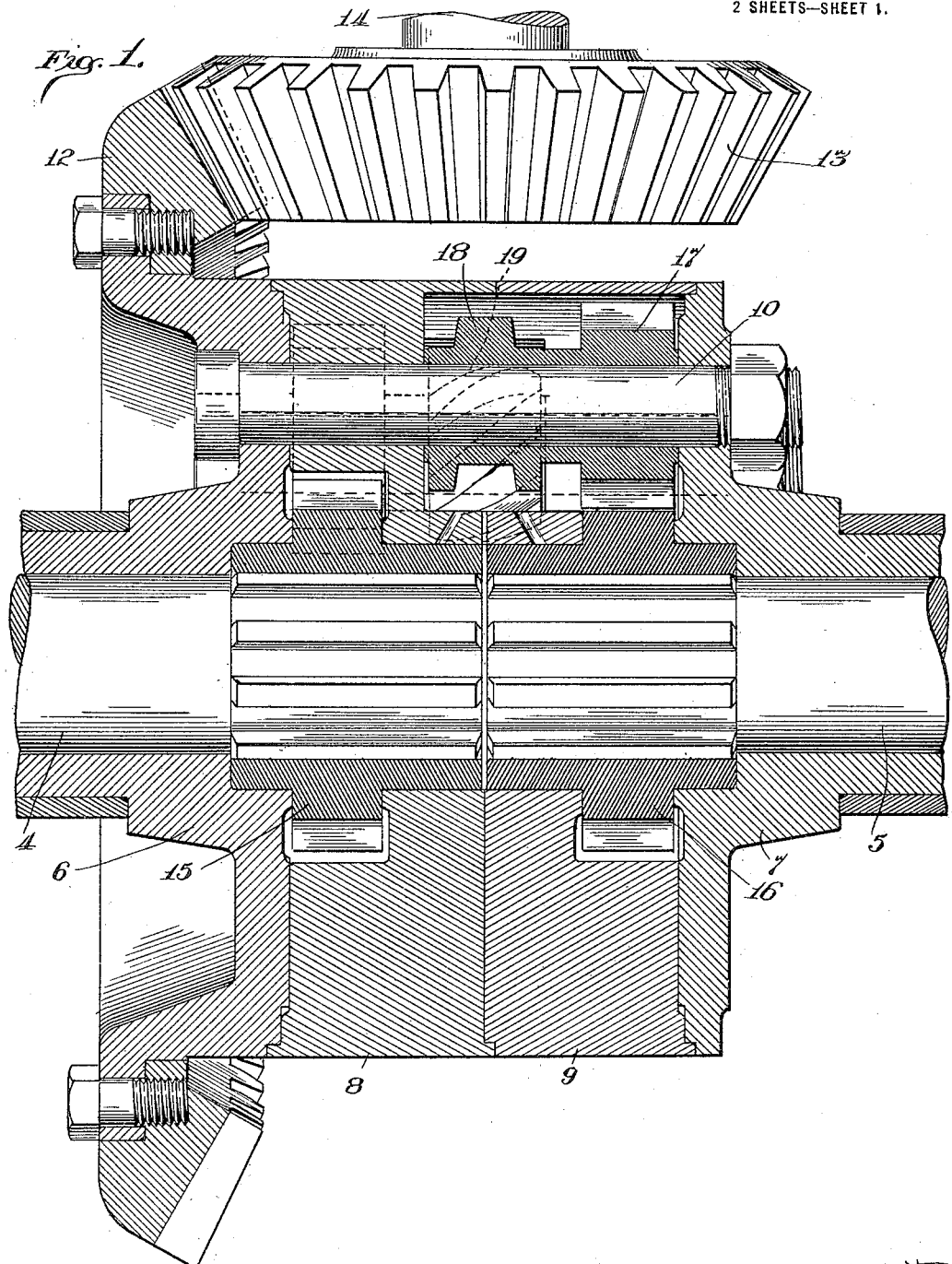

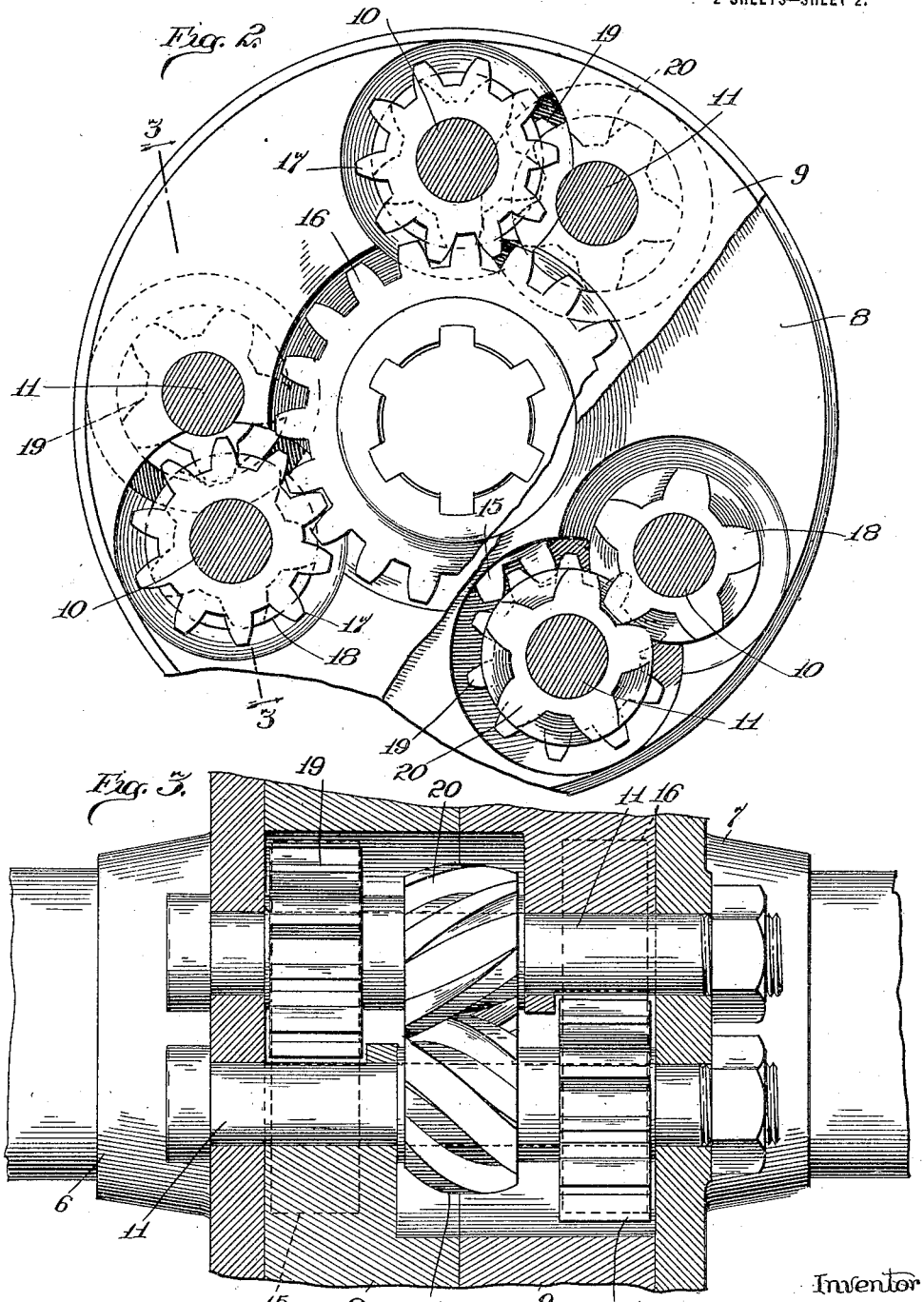

ALFRED O. WILLIAMS, OF SOUTH BEND, INDIANA, ASSIGNOR TO CLARK EQUIPMENT COMPANY, OF BUCHANAN, MICHIGAN, A CORPORATION OF MICHIGAN.

DIFFERENTIAL GEARING.

1,397,066.      Specification of Letters Patent.      Patented Nov. 15, 1921.

Application filed May 27, 1918. Serial No. 236,789.

*To all whom it may concern:*

Be it known that I, ALFRED O. WILLIAMS, a citizen of the United States, and a resident of South Bend, in the county of St. Joseph and State of Indiana, have invented certain new and useful Improvements in Differential Gearing, of which the following is a specification, reference being had to the accompanying drawings.

My invention relates to differential gearing for motor vehicles, and has for its object to provide certain improvements in differential gearing by which the usual differential action of the driven shafts will be permitted, and in addition, the tendency of the wheel having less traction to "race" will be reduced, without however providing a positive lock. In other words, it is my object to interconnect the members of the differential gearing by a friction creating device which reduces, but does not entirely prevent, the tendency of the wheel having less traction to race. I accomplish this object as illustrated in the drawings and as hereinafter described. What I regard as new is set forth in the claims.

In the accompanying drawings:—

Figure 1 is a central vertical section of the differential gearing, showing part of the propeller shaft and the drive gear carried thereby in elevation, Fig. 2 is a side elevation of the differential gearing, the right hand end member of the housing as shown in Fig. 1, being removed and certain parts being broken away, and Fig. 3 is a sectional view on line 3—3 of Fig. 2.

Referring to the drawings, 4—5 indicate driven shafts or axle members, which are journaled at their inner ends in suitable bearings in the end members 6—7 of the differential housing. 8—9 indicate intermediate members of the differential housing, the four members 6, 7, 8, and 9 being secured together by bolts 10—11, arranged in pairs, as shown in Fig. 2. Preferably there are three such pairs of bolts, as shown in said figure.

12 indicates a beveled ring gear, which is secured to or formed integral with the member 6, as shown in Fig. 1, and meshes with a beveled gear 13, carried by the usual propeller shaft 14. 15—16 indicate spur gears, mounted respectively on the inner ends of the driven shafts 4—5, and suitably keyed thereto. 17 indicates spur pinions which are mounted on the bolts 10, and mesh with the spur gear 16, as shown in Figs. 1 and 2. 18 indicates right hand spiral pinions which are also mounted on the bolts 10 adjacent to the pinions 17, with which they are non-rotatably connected, being preferably formed integral therewith, as shown in Fig. 1. 19 indicates spur pinions, similar to the spur pinions 17, which are mounted on the bolts 11, and mesh with the spur gear 15, as shown in Fig. 2. 20 indicates left hand spiral pinions, similar to the pinions 18, which are mounted on the bolts 11, and are secured to or formed integral with the pinions 19, as shown in Fig. 3. The spiral pinions 18 and 20 on the bolts 10—11 of each pair intermesh, as shown in Figs. 2 and 3, and thereby operatively interconnect the spur pinions 17 and 19 to which they are respectively secured.

It will be apparent that when the propeller shaft 14 is driven, as by a motor of any suitable description, the differential drive gear 12 will be rotated, thereby rotating the differential housing, and revolving the spur pinions 17 and 19 about the axis of the driven shafts 4—5. If both drive wheels carried by the shafts 4—5 have equal traction, the spiral pinions 18—20 operate to hold the spur pinions 17—19 against rotating relatively to each other and to the spur gears 15—16, and consequently the power will be transmitted equally to the shafts 4—5. If, however, one wheel has less traction than the other, the spiral pinions serve as a friction creating device which prevents all the driving power from being transmitted to the wheel having less traction, which would result in the racing of the latter wheel, and transmits a considerable portion of it to the other wheel, without however preventing differential action as between the two wheels. The relative distribution of the power as between the two wheels in rounding curves, or in slippery places where one wheel has more traction than the other, depends upon the pitch of the teeth of the spiral pinions, which may vary from 10 to 50 degrees, and I, therefore, do not limit my invention to making the spiral pinions with teeth having the precise angle illustrated in the drawings. Neither do I limit myself to using the number of pairs of spur and spiral pinions shown in the drawings, as a greater or less number of pairs may be used if desired.

What I claim as my invention, and desire to secure by Letters Patent, is:—

1. In a differential, the combination of a housing comprising end and intermediate members, bolts securing said housing members together, two shafts extending into said housing and having their inner end portions journaled therein, two gears fixed on said shafts adjacent to the end portions of said housing respectively, two pinions mounted on said bolts in staggered relation to each other, said pinions being in mesh with said gears respectively, and spiral gears rotating with said pinions respectively on said bolts and meshing with each other, adapted to permit said pinions to rotate in opposite directions.

2. In a differential, the combination of a housing comprising two end members and two intermediate members, bolts securing said housing members together, two shafts extending into said housing, and having their inner end portions journaled therein, two gears fixed on said shafts adjacent to the end portions of said housing respectively, two pinions mounted on said bolts in recesses formed in said intermediate members in staggered relation to each other, said pinions being in mesh with said gears respectively, and spiral gears rotating with said pinions respectively on said bolts and meshing with each other adapted to permit said pinions to rotate in opposite directions.

ALFRED O. WILLIAMS.